(12) United States Patent
Kim

(10) Patent No.: US 6,278,884 B1
(45) Date of Patent: *Aug. 21, 2001

(54) PORTABLE INFORMATION COMMUNICATION DEVICE

(76) Inventor: Ki Il Kim, 255 S. Grand Ave., Suite 2004, Los Angeles, CA (US) 90012

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/846,108

(22) Filed: Apr. 25, 1997

(30) Foreign Application Priority Data

Mar. 7, 1997 (KR) ................................. 1997-4194
Mar. 26, 1997 (KR) ............................... 1997-5841

(51) Int. Cl.$^7$ ............................. H04B 1/38; H04N 7/14; H04M 11/00
(52) U.S. Cl. ................. 455/556; 455/404; 455/521; 455/575; 348/14.02; 379/102.02
(58) Field of Search ................. 455/404, 521, 455/556, 575, 9; 348/14, 17, 14.01–14.03, 14.08, 14.11, 14.14; 379/37–51, 102.02, 102.03, 90.01, 40, 41, 42, 43, 44, 45

(56) References Cited

U.S. PATENT DOCUMENTS

| | | | |
|---|---|---|---|
| 4,481,382 | * | 11/1984 | Villa-Real .......................... 455/556 |
| 4,591,661 | * | 5/1986 | Benedetto ......................... 455/556 |
| 4,825,457 | * | 4/1989 | Lebowitz .............................. 379/40 |
| 5,063,587 | * | 11/1991 | Semasa et al. ................. 348/14.14 |
| 5,144,661 | * | 9/1992 | Shamosh et al. ..................... 380/9 |
| 5,334,974 | * | 8/1994 | Simms et al. ...................... 340/990 |
| 5,343,509 | * | 8/1994 | Dounies ............................... 379/40 |
| 5,382,943 | * | 1/1995 | Tanaka ............................... 340/539 |
| 5,463,595 | * | 10/1995 | Rodhall et al. ..................... 367/93 |
| 5,485,504 | * | 1/1996 | Ohnsorge ........................... 455/566 |
| 5,491,507 | * | 2/1996 | Umezawa et al. ................... 384/14 |
| 5,515,285 | * | 5/1996 | Garrett, Sr. et al. ............... 701/300 |
| 5,517,547 | * | 5/1996 | Ladha et al. ......................... 379/40 |
| 5,546,072 | * | 8/1996 | Creuseremee et al. ........... 340/574 |
| 5,587,701 | * | 12/1996 | Hess ................................... 340/541 |
| 5,666,159 | * | 9/1997 | Parulski et al. .................... 348/211 |
| 5,726,660 | * | 3/1998 | Purdy et al. ........................ 342/357 |
| 5,740,543 | * | 4/1998 | Maeda ................................ 455/550 |
| 5,742,666 | * | 4/1998 | Alpert .................................. 379/40 |
| 5,748,081 | * | 5/1998 | Lin ..................................... 340/555 |
| 5,793,419 | * | 8/1998 | Fraley ................................ 348/143 |
| 5,806,005 | * | 9/1998 | Hull et al. .......................... 455/566 |
| 5,808,564 | * | 9/1998 | Simms et al. ...................... 340/990 |
| 5,815,201 | * | 9/1998 | Hashimoto et al. ............... 348/232 |
| 5,893,037 | * | 4/1999 | Reele et al. ....................... 455/556 |
| 5,910,815 | * | 6/1999 | Boursier et al. .................... 348/14 |
| 5,917,542 | * | 6/1999 | Moghadam et al. .............. 348/207 |
| 5,926,210 | * | 7/1999 | Hackett et al. .................... 348/158 |
| 5,943,603 | * | 8/1999 | Parulski et al. .................... 455/3.1 |
| 5,963,245 | * | 10/1999 | McDonald .......................... 348/14 |
| 6,002,326 | * | 12/1999 | Turner ............................... 340/426 |
| 6,011,967 | * | 1/2000 | Wieck ................................ 455/404 |
| 6,014,573 | * | 1/2000 | Lehtonen et al. ................. 455/569 |
| 6,046,730 | * | 4/2000 | Bowen et al. ..................... 345/168 |
| 6,069,648 | * | 5/2000 | Suso et al. .......................... 348/14 |
| 6,073,034 | * | 6/2000 | Jacobsen et al. ................. 455/566 |
| 6,137,525 | * | 10/2000 | Lee et al. ............................ 348/14 |

FOREIGN PATENT DOCUMENTS

| | | | |
|---|---|---|---|
| 19806508-A1 | * | 8/1999 | (DE) . |
| 03109891 | * | 5/1991 | (JP) . |
| 406268582-A | * | 9/1994 | (JP) ..................................... 455/550 |
| 408294030-A | * | 11/1996 | (JP) . |
| WO-96/ 38762-A1 | * | 12/1996 | (WO) ........................... G03B/11/00 |

* cited by examiner

Primary Examiner—Vivian Chang
Assistant Examiner—Charles N. Appiah
(74) Attorney, Agent, or Firm—Lyon & Lyon LLP

(57) ABSTRACT

A conventional portable cellular phone modified such that the phone housing incorporates a digital cameras security alarm system and other functions. In another embodiment, the portable cellular phone is modified such that the phone housing incorporates a security alarm system, radio receiver and other functions.

17 Claims, 4 Drawing Sheets

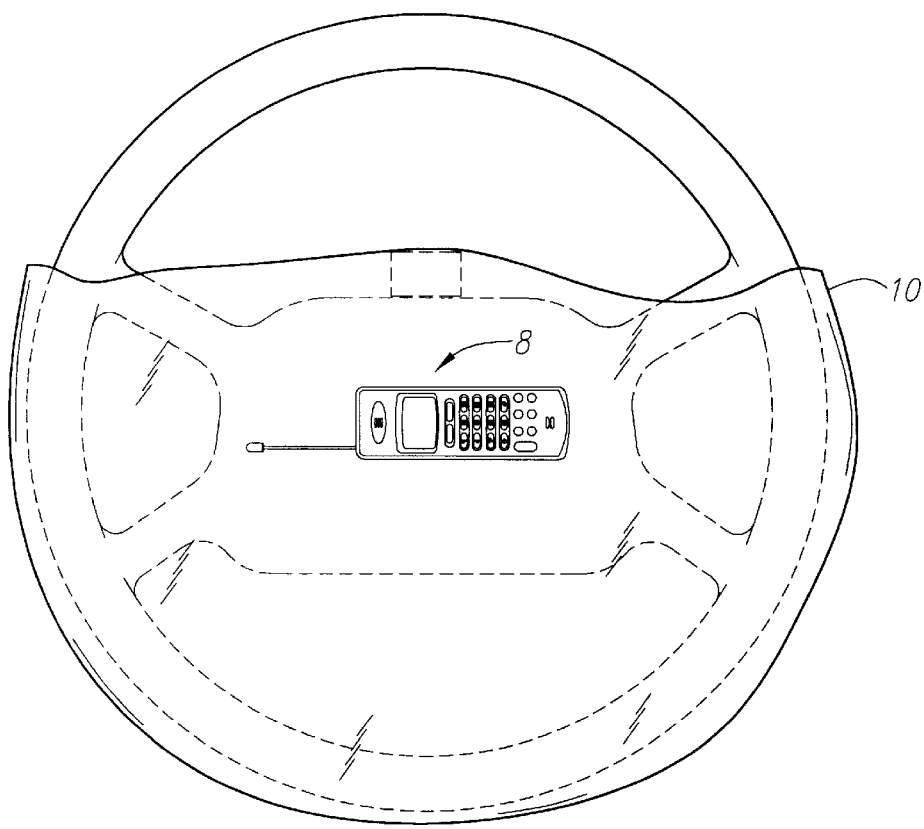
FIG. 5
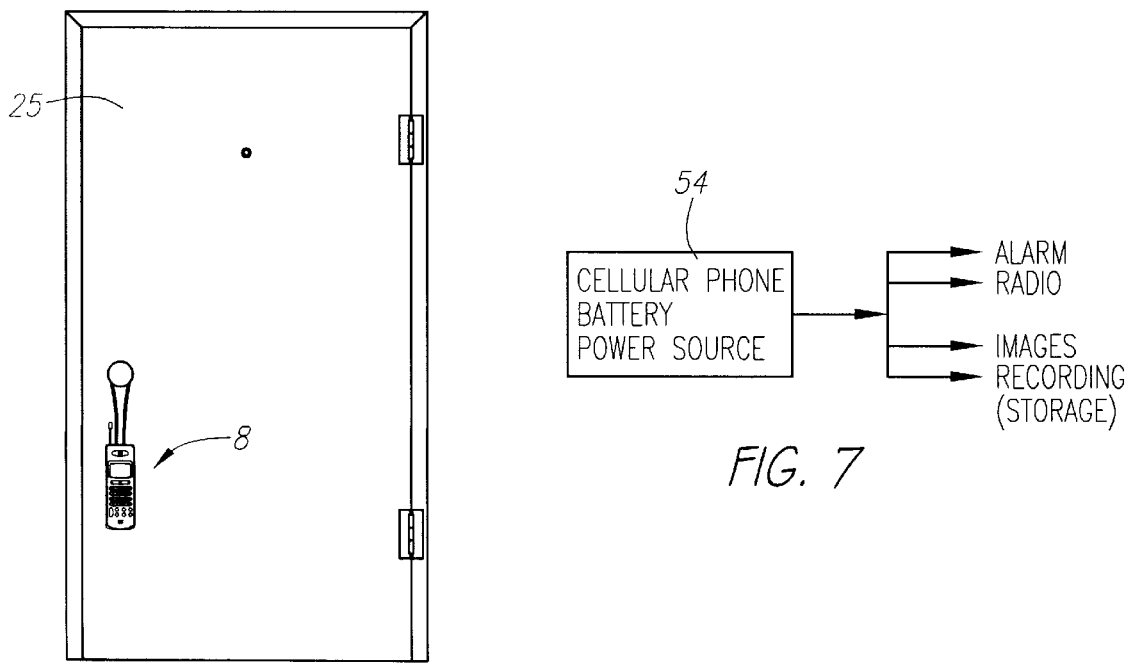
FIG. 6
FIG. 7

PORTABLE INFORMATION COMMUNICATION DEVICE

BACKGROUND OF THE INVENTION

1. Field of the Invention

The present invention provides a conventional portable cellular phone modified to incorporate a security alarm, radio receiver and other functions.

2. Description of the Prior Art

The portable cellular phone has found wide public acceptance since its commercial introduction. The ease in which communications between the user and the call recipient can be accomplished has extended its use in areas not heretofore contemplated. For example, U.S. Pat. No. 5,555,286 to Tendler discloses a cellular phone system in which the cellular phone is utilized for transmitting signals in natural speech, the signals indicating the position of a vessel, vehicle or an individual upon system activation from the cellular phone keyboard or from a remote source. U.S. Pat. No. 5,043,736 to Darnell et al. discloses a device that can be used as a cellular telephone and portable global position system and provides latitude and longitude information to a base unit display; U.S. Pat. No. 5,081,667 to Drori et al, discloses a system for integrating cellular communication systems with vehicle security systems; U.S. Pat. No. 5,515,043 to Berard et al, which utilizes a cellular phone handset in a system for tracking the position of a vehicle, and U.S. Pat. No. 5,515,419 to Sheffer discloses a system for tracking a portable or mobile phone and include means for generating an emergency signal on detection of an emergency condition and transmitting the emergency signal to a remote monitoring station. The Sheffer system includes a portable phone unit which is similar to a conventional portable phone but which incorporates the hardware or software necessary to generate and transmit the necessary emergency signal should the user push the panic button.

The above patents disclose various forms of position locating/alarm systems utilizing cellular phones and while useful for the functions they disclose, are beyond the financial resources of the average consumer. However, the portability of cellular phones and the fact that the phones and the connection service therefor are relatively inexpensive, makes the cellular phone system useful for other, less expensive functions. For example, a cellular phone user may be travelling and want a separate alarm system placed in his/her hotel room. Or the user desires to have a radio receiver associated within the phone housing so that radio programs could be heard when the telephone is not in use. Other functions capable for use with the cellular phone but not currently available include the capture and storage of images and audio signals.

What is thus desired is to provide a multi-function, portable cellular phone modified to incorporate in a first embodiment an alarm sensor, and an image capture and storage device in the same housing, a second embodiment incorporating an AM/FM radio receiver, the cellular phone, in both embodiments, being activated by keyboard or by voice control, activation of the cellular phone causing the automatic dialing of a pre-coded phone number, such as an emergency service (police) and home.

SUMMARY OF THE PRESENT INVENTION

The present invention provides a multi-function portable cellular phone modified to incorporate features that enhance the utility of the phone, and in particular provides a portable and lightweight security system.

In a first embodiment, the cellular phone is modified to incorporate an alarm, camera (image) and audio capture functions in the same housing. In a second embodiment, the cellular phone is modified to incorporate an alarm, radio, camera and audio capture in the same housing.

Using the cellular phone in the manner described hereinabove provides a relatively inexpensive technique for proving a multi-function device that is portable and relatively inexpensive and includes a security alarm system which provides a local alarm and also an alarm signal to a remote emergency service.

DESCRIPTION OF THE DRAWINGS

For a better understanding of the invention as well as other objects and further features thereof, reference is made to the following description which is to be read in conjunction with the accompanying drawing wherein:

FIG. 5 illustrates the use of the modified portable cellular phone as an alarm device in a vehicle wheel cover;

FIG. 6 illustrates the use of the modified portable cellular phone as an alarm device on a door; and FIG. 7 is a simplified block diagram of a single battery source for supplying power for the cellular phone functions.

DESCRIPTION OF THE INVENTION

Figure 1:
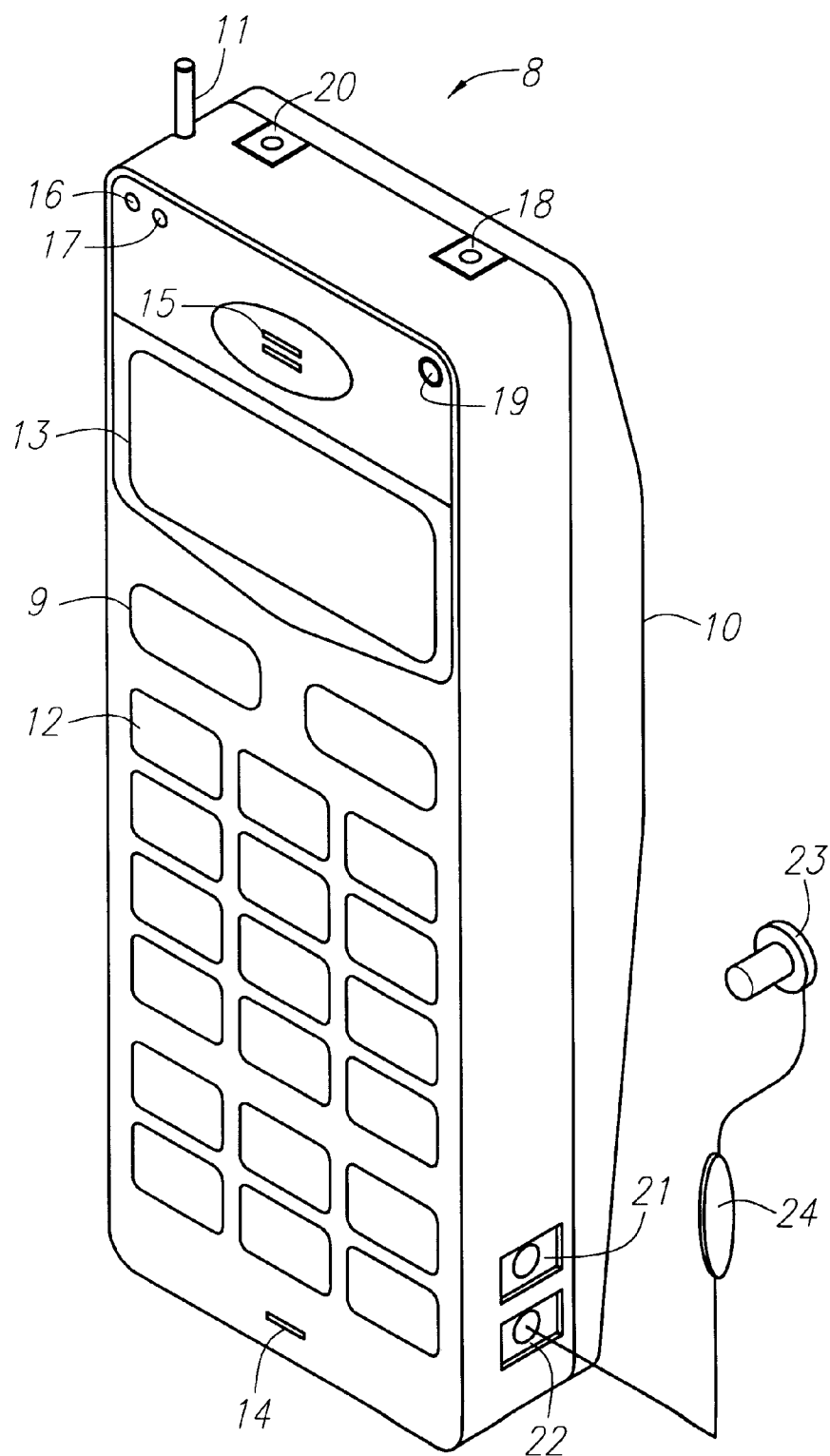
FIG. 1 is a perspective view of a first embodiment of a portable cellular phone modified in accordance with the teachings of the present invention without a radio receiver.

Referring now to FIG. 1, a perspective view of a first embodiment of a cellular phone 8, modified in accordance with the teachings of the present invention, is illustrated.

Portable cellular phone 8 having housing 10 is of conventional design and has the standard dialing and receiving functions with SEND button 9, antenna 11, keypad 12, display 13, microphone 14, and speaker 15. In accordance with the teachings of the present invention, phone 8 is modified to incorporate alarm sensors 16, sound (horn) device 17, a two step camera switch button 18, with two audio beeps indicating that an image/camera sensor 19,is on for normal use, a two step alarm switch 20 which, when pressed once in case of an emergency, the alarm and image and recording functions being activated and two beeps being sounded, switch 20 acting as a panic button when pressed once, a television/personal computer connection output jack 21 for viewing/listening to the stored audio signals and images, phone/radio jack 22, receiver 23 and microphone 24.

As will be explained hereafter in more detail with reference to FIG. 2, sensors 16 are adapted to detect movement such as motion, infrared and ultrasonic sensors. This is particularly useful if the phone 8 is mounted on a door 25 in a hotel room for example, as shown in FIG. 6, when a user is traveling. In this case, detection of movement triggers sound device 17 via a horn within the cellular phone housing 10 to notify the cellular phone user and/or to scare off potential intruders (panic button 20 can also be depressed as will be described hereinafter). The alarm, in conjunction with a modem built into phone 8, signals remote emergency services, such as the police, using a conventional wireless communication system thereby notifying the service of an emergency situation in the manner described in the aforementioned Sheffer patent.

The ear phone, or receiver, portion 23 enables a user to hear audio alarm signals transmitted by the phone 8 and microphone 24 enables a user to talk through the cellular phone 8 without being limited to the mouthpiece portion of the cellular phone 8 while also functioning as a radio telephone in a vehicle.

Figure 2:
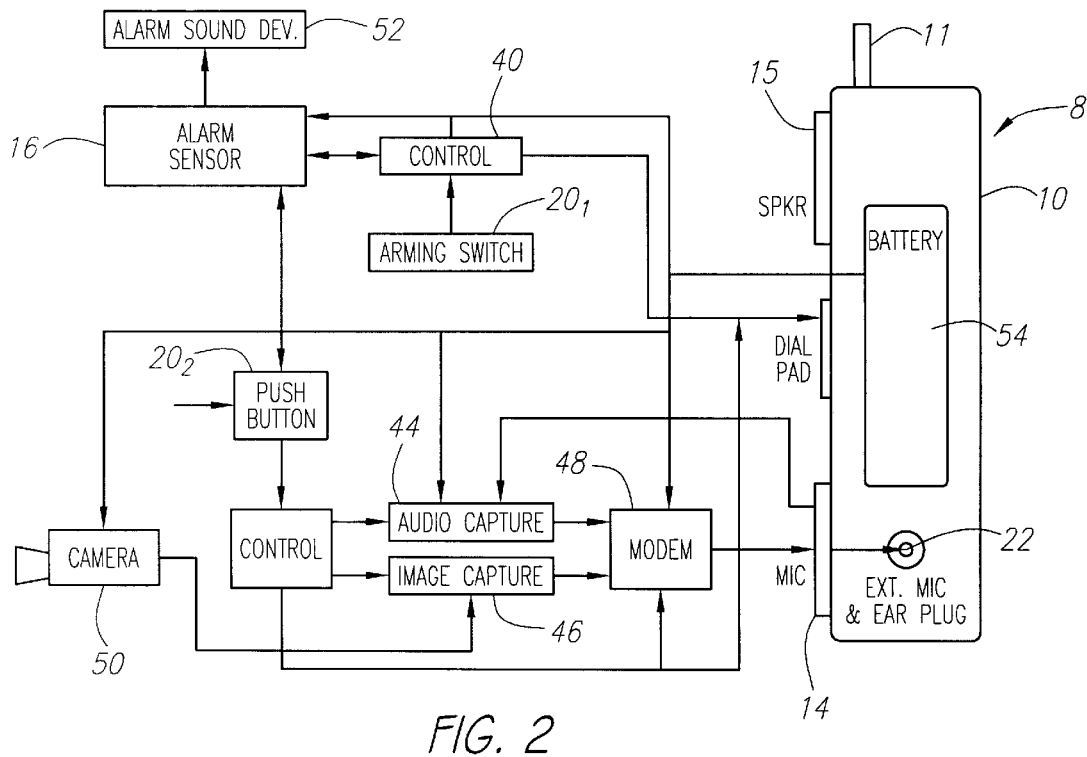
FIG. 2 is a system block diagram of the modified cellular phone shown in FIG. 1 in accordance with the teachings of the present invention.

FIG. 2 is a block diagram of the system shown in FIG. 1, the components shown all being mounted within housing 10. The SEND button 9 is configured so that it is triggered when sensors 16 are activated or from the panic button 20 provided on phone 8. Sensors 16 have an arming control 40 associated therewith which is activated when exiting a vehicle or area and is activated by depressing key 20 twice. An indicator can be provided to show that the system has accepted the arming command.

When sensors 16 are triggered, audio storage (capture) 44 and video storage (capture) 46 are initiated to render transmittable replicas of the intrusion sounds and images over the cellular phone 8 to a central office via available wireless communication systems. In this way, the image of the intruder can be reported to the police, and the alarm also verified.

A modem 48 is wired into the external microphone and speaker jack 22 to allow transmission of the captured, or stored, video and audio signals. The audio can be played back directly through microphone input 14 without going through modem 48. The modem 48 can be bypassed for audio, but is necessary for image data. Further, the audio can be maintained as an input after the intrusion sounds and images have been transmitted. Random images can be transmitted after the initial rendering of the intrusion data. Thus, if the vehicle is stolen, the sound and images can be monitored to get an idea of the whereabouts of the vehicle and if the thief is still towing the car.

Figure 4:
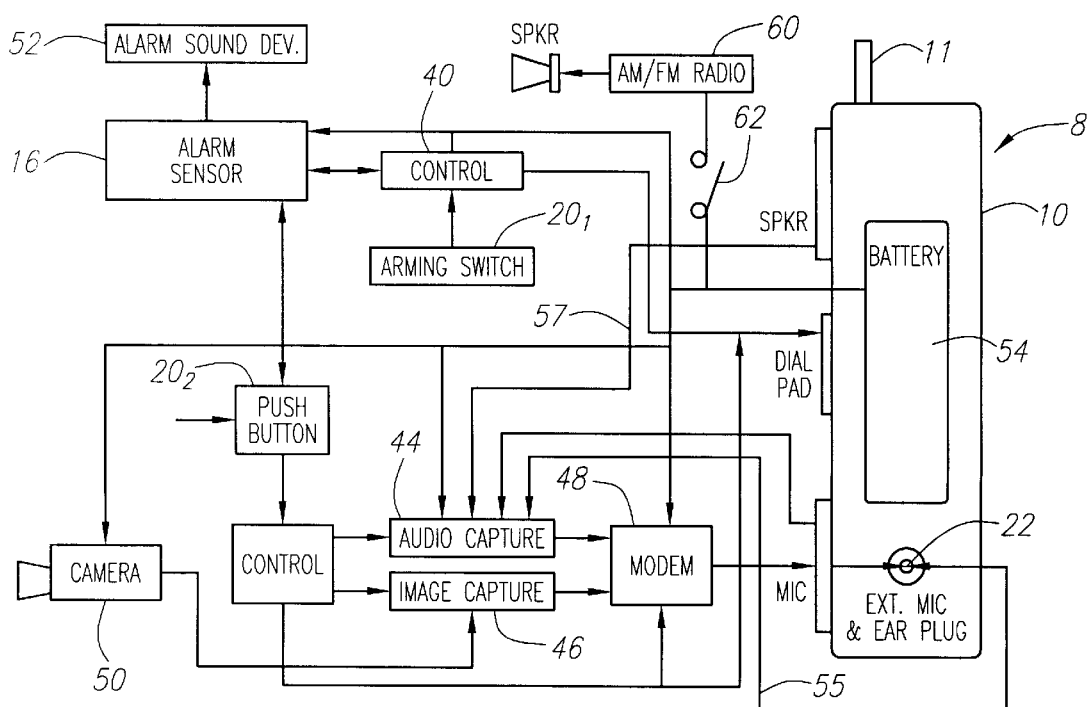
FIG. 4 is a system block diagram of the modified cellular phone shown in FIG. 3 in accordance with a second embodiment of the present invention.

As shown in FIG. 4, AM/FM radio receivers can optionally be included for entertainment when the alarm system is not in use. The alarm and radio function components can be mounted on the same printed circuit board within housing 10 or on separate circuit boards.

The intrusion sounds and images are sent when the sensors 16 detect movement of the vehicle (or persons when in a hotel room) but only when switch 20 has been depressed twice to arm the system or when depressed once to function as a panic key.

The panic mode of key 20 can also be adapted to initiate the capture of video (or pictures), via camera 50 and audio in non-alarm situations when the key is pressed once, the audio signals and images being recorded (stored) for later transmission when SEND button 9 is depressed; if key 20 is pressed twice in succession or maintained depressed for a predetermined period of time, the panic mode will be implemented and the intrusion pictures taken along with sound. Phone 8 is then activated to automatically dial and send the collection of recorded (stored) sounds and images to a remote central office for processing and response as described hereinabove.

A sound device 52 is connected to alarm sensors 16 and is used in the panic mode.

In accordance with another feature of the present invention, battery pack power source 54 is mounted to housing 10 and provides power to phone 8, alarm sensors 16, radio receiver 60 (FIGS. 3 and 4), image capture device 46 and camera device 50. Using a single battery source for phone 8 and the added functions allows the modified phone 8 to be reduced in size and manufactured in a more economical manner.

Figure 3:
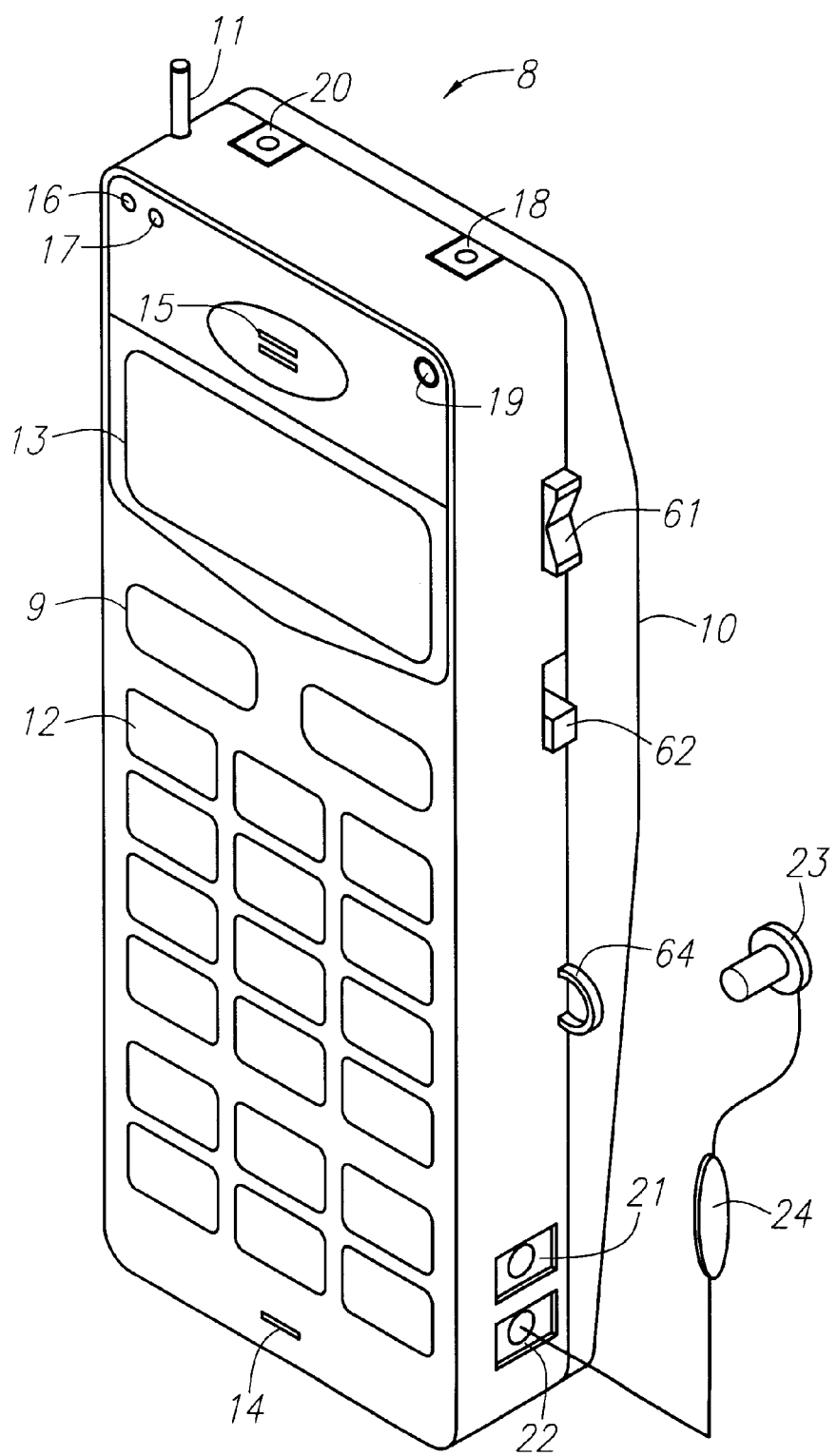
FIG. 3 is a perspective view of a second embodiment of a portable cellular phone modified in accordance of the present invention with a radio receiver.

The embodiment shown in FIGS. 2 and 4 is substantially identical to the embodiment shown in FIGS. 1 and 3 with the exception that a radio receiver 60 is added. In particular, and referring to FIG. 3, housing 10 further includes radio receiver volume control 61, AM/FM switch 62 and radio station control switch 64g Radio receiver 60 can be used when the alarm function is deactivated. In addition, lead 55 connects audio capture 44 to jack 22, allowing a captured conversation to be recorded. Lead 57, also connected to audio capture 44 allows two way conversations to be recorded, whether via telephone conversations between the cellular phone user and a third party or conversations of persons present near phone 8 (similar to a conventional recording device).

FIG. 5 shows another use for the modified cellular phone 8. In particular, phone 8 is mounted on the anti-theft wheel cover described in U.S. Pat. No. 5,540,067 to provide an additional technique for preventing theft of a vehicle or tracking the vehicle if it is stolen. The teachings of the '067 patent necessary for an understanding of the present invention are incorporated herein by reference.

The present invention thus provides a conventional portable cellular phone modified to incorporate other useful functions relatively inexpensively and which has many practical applications in addition to those described hereinabove.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A handheld portable information recording and communication device for communicating with remotely located telephones, comprising:

a camera and a cellular telephone electrically connected and mounted in a portable housing of a size and weight for being handheld by a person, said cellular telephone having a microphone, a speaker and a dial pad for selective use by the person for placing and receiving person-to-person telephone calls to and from remotely located telephones;

a battery means in the housing for supplying electrical power to said camera, and said cellular telephone;

means for selectively activating said camera and said microphone for capturing images and sounds within a range of said housing;

means for activating said cellular telephone for wirelessly communicating with a specific remotely located telephone by dialing the number of said specific remotely located telephone and, when said cellular telephone and said specific remotely located telephone are telephonically connected, then transmitting said images and said sounds from said camera and microphone to said specific remotely located telephone concurrently with the capturing of said images and said sounds;

a memory means in said housing operatively connected to said camera, said cellular telephone and said battery means for selectively storing said images captured by said camera and said sounds captured by said microphone;

means for selectively causing said stored images and said stored sounds to be transmitted by said cellular telephone to said specific remotely located telephone;

said memory means including an audio recorder mounted in said housing and having means for selectively recording audible transmissions during the person-to-person telephone calls to and from said cellular telephone and for selectively recording sounds within a range of said housing without a telephone call; and switch means for selectively and separately operating (a) said means for selectively activating said camera, (b) said microphone, (c) said cellular telephone, (d) said memory means, (e) said means for selectively causing said stored images and said stored sounds to be transmitted, and (f) said audio recorder.

2. A handheld portable information recording and communication device for communicating with remotely located telephones, comprising:

a camera and a cellular telephone electrically connected and mounted in a portable housing of a size and weight for being handheld by a person, said cellular telephone having a microphone, a speaker and a dial pad for selective use by the person for placing and receiving person-to-person telephone calls to and from remotely located telephones;

a battery means in the housing for supplying electrical power to said camera and said cellular telephone;

means for selectively activating said camera and microphone for capturing images and sounds within a range of said housing;

alarm sensor means mounted in said housing for detecting a sound or movement within a predetermined range of said housing;

means for selectively arming said alarm sensor means for then automatically operating said means for activating the camera and microphone and activating said cellular telephone, when said sensor means detects a sound or movement, for wirelessly communicating with a specific remotely located telephone by dialing the number of said specific remotely located telephone are telephonically connected, then transmitting said images and said sounds from said camera and microphone to said specific remotely located telephone;

a memory means in said housing operatively connected to said camera, said cellular telephone and said battery means for selectively storing said images captured by said camera and said sounds captured by said microphone;

means for selectively causing said stored images and said stored sounds to be transmitted by said cellular telephone to said specific remotely located telephone;

said memory means including an audio recorder mounted in said housing and having means for selectively recording audible transmissions during the person-to-person telephone calls to and from said cellular telephone and for selectively recording sounds within a range of said housing without a telephone call; and switch means for selectively and separately operating (a) said means for selectively activating said camera, (b) said microphone, (c) said cellular telephone, (d) said alarm sensor means, (e) said means for selectively arming said alarm sensor means, (f) said memory means, (g) said means for selectively causing said stored images and said sounds to be transmitted, (h) and said audio recorder.

3. The device of claim 2, further comprising a jack connection for directly connecting said memory means to a computer for downloading said stored images and sounds from said digital memory means.

4. The device of claim 2, further comprising an AM/FM radio means mounted in said housing and having controls for selective operation.

5. The device of claim 2, further comprising a remote microphone and ear piece connected by wire means to said cellular telephone for remotely using said cellular telephone.

6. The device of claim 2, further comprising an alarm means mounted in said housing and being activated to produce an alarm when said sensor means detects a sound or movement.

7. The device of claim 2, wherein said battery means comprises a single battery.

8. The device of claim 2, further including means for selectively reproducing sounds recorded on said audio recorder at said housing.

9. A handheld portable information recording and communication device for communicating with remotely located telephones, comprising:

a digital camera and a cellular telephone electrically connected and mounted in a portable housing of a size and weight for being handheld by a person, said cellular telephone having a microphone a speaker and a dial pad for selective use by the person for placing and receiving person-to-person telephone calls to and from remotely located telephones;

a single battery mounted in said housing for supplying electrical power to said digital camera and said cellular telephone;

alarm sensor means mounted in said housing for detecting a sound or movement within a predetermined range of said housing;

means automatically activating said digital camera and said microphone for capturing images and sounds within a range of said housing when said alarm sensor means detects a sound or movement;

a switch means on said housing, said switch means including means for selectively arming said alarm sensor means;

means for automatically activating said cellular telephone when said sensor means is armed and detects a sound or movement for wirelessly communicating with a specific remotely located telephone by dialing the number of said specific remotely located telephone and, when said cellular telephone and said specific remotely located telephone are telephonically connected, then transmitting said images and said sounds from said digital camera and said microphone to said specific remotely located telephone;

a digital memory means for storing said images captured by said digital camera and said sounds captured by said microphone;

means for selectively causing said stored images and said stored sounds to be transmitted by said cellular telephone to said specific remotely located telephone;

said switch means also operable for manually activating said digital camera without activating said cellular telephone;

said switch means also operable for manually activating said digital camera and said cellular telephone for both capturing and transmitting said images;

said digital memory means including an audio recorder mounted in said housing and having means for selectively recording audible transmissions during the person-to-person telephone calls to and from said cellular telephone and for selectively recording sounds within a range of said housing without a telephone call;

means for selectively reproducing sounds recorded on said audio recorder at said housing;

a radio means mounted in said housing and having controls for selective operation of said radio means; and a jack connection for directly connecting said digital memory means of the device to a television for reproducing or a computer for downloading said recorded images and said recorded sounds from said digital memory means.

10. The device of claim 9, further comprising means for activating an audible alarm mounted in said housing.

11. The device of claim 9, further comprising a microphone and ear piece connected by wire means to said cellular telephone for remotely using said cellular telephone.

12. A handheld portable cellular telephone having additional information, video and audio capabilities integral with the cellular telephone which is normally for ordinary use by a person for ordinary calls comprising:

a camera, a microphone and an ordinary cellular telephone electrically connected and mounted in the same and a conventional housing of a size and weight for being handheld by a person; said cellular telephone having a microphone, a speaker and a dial pad accessible for selective use by the person for placing and receiving normal person to person telephone calls as with a conventional cellular telephone; battery means in the housing for supplying electrical power to said camera, microphone and said cellular telephone; means for selectively activating said camera and said microphone for capturing images and sounds within a range of said housing; means for recording the images and sounds and means for activating said cellular telephone for wirelessly communicating with a specific remotely located telephone at a remote site by automatically dialing the number of the said specific remotely located telephone in response to the person's command or pre-selected automatic sensing means and, when said cellular telephone and said remote site are telephonically connected, the stored or current images and sounds from said camera and said microphone are transmitted to the said connected remote site by an audio means of the said ordinary cellular telephone via encoded data means of a modem; and said recording of images and sounds can be either from automatic sensing means activating said recording means or from the person's commands, and said recordings are conveyed either by the person selected dialing or pre-selected automatic dialing means.

13. The handheld cellular telephone of claim 12, wherein said automatic sensing means includes a motion sensor.

14. The handheld cellular telephone of claim 13, wherein said automatic sensing means includes an ultrasonic sensor.

15. The handheld cellular telephone of claim 12, wherein said automatic sensing means includes an infrared sensor.

16. The handheld cellular telephone of claim 15, wherein said automatic sensing means includes an ultrasonic sensor.

17. The handheld cellular telephone of claim 12, wherein said automatic sensing means includes an ultrasonic sensor.

* * * * *